May 19, 1964  P. SCHRANZ  3,134,018
METHOD AND DEVICE FOR CONTINUOUS MEASUREMENT OF RADIOACTIVITY
OF SUBSTANCES CONTAINED IN A LIQUID
Filed Nov. 5, 1959
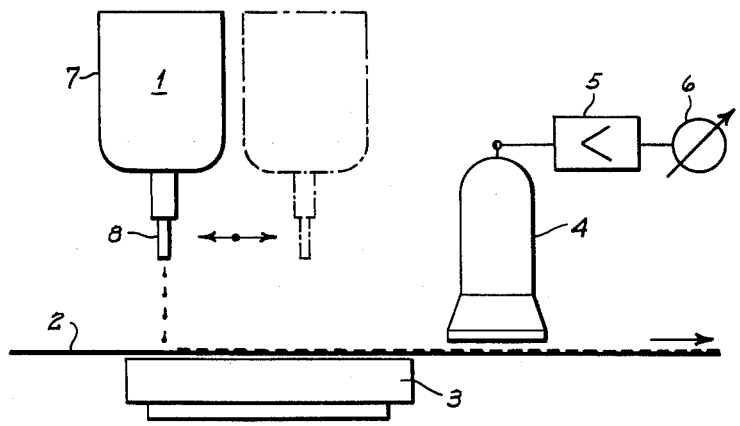
INVENTOR.
PETER SCHRANZ
BY
Morgan, Finnegan, Durham & Pine
ATTORNEYS.

United States Patent Office 3,134,018
Patented May 19, 1964

3,134,018
METHOD AND DEVICE FOR CONTINUOUS MEASUREMENT OF RADIOACTIVITY OF SUBSTANCES CONTAINED IN A LIQUID
Peter Schranz, Oberwil, Zug, Switzerland, assignor to Landis & Gyr, A.G., Zug, Switzerland, a body corporate of Switzerland
Filed Nov. 5, 1959, Ser. No. 851,112
Claims priority, application Switzerland Dec. 3, 1958
4 Claims. (Cl. 250—43.5)

For continuous measurement of radioactivity of substances contained in a liquid, for example water, it is necessary to concentrate the radioactive substances contained in the liquid in order to obtain reliable observations, owing to the low activity ordinarily encountered.

In a known device, this concentration is accomplished by spraying and evaporation of the liquid to be tested in a uniform stream in a heated air current, whereupon the mixture of air and vapor is filtered through a filtering strip in continuous motion. The substances that were dissolved or suspended in the liquid are captured in the filtering strip and conveyed to a radiation detector.

This arrangement has the principal disadvantage that the air employed must first be thoroughly filtered, and that a nevertheless remaining residue of air activity impairs the precision of measurement. Also, the filtering action of the strip is not perfect, and some of the active substance deriving from the liquid escapes through it and is not detected upon measurement. The walls of the air passage in which the evaporation occurs are radioactively contaminated besides, further impairing the precision of measurement.

Another device has been proposed in which a discontinuously advanced strip of metal having depressions is provided, in which depressions measured quantities of the liquid to be tested are placed for evaporation, whereupon the residues are conveyed past radiation detectors which measure their activity. The metal strip is either used only once, a very wasteful proceeding, or else decontaminated by means of special complicated equipment, the results being of course problematical, since it is very difficult to remove the active particles completely by washing.

The present invention relates to a method in which the aforesaid disadvantages are eliminated by feeding the liquid with radioactive substances contained in it in a uniform stream to a strip of absorbent material in uniform motion, applying heat to the latter for evaporation, and then measuring the radioactivity of the substances deposited on the strip. It is accordingly an object of the invention to provide a method and apparatus for measuring the radioactivity of substances contained in a liquid with heretofore unattainable accuracy, on a continuous basis, without the need for expensive auxiliary equipment and without requiring the expenditure of substantial materials. This and other objects and advantages of the invention will be set forth in part hereinafter and in part will be obvious herefrom, or may be learned by practice with the invention, the same being realized and attained by means of the instrumentalities, processes, steps and combinations pointed out in the appended claims.

The device for practicing this method is characterized in that a feeding means equipped with a metering means is provided for the liquid to be analyzed, by which means the liquid is fed to a strip of absorbent material uniformly moving past and beneath the feeding means, and in that other means are provided for heating the strip, and at least one radiation detector is provided past which the strip is likewise moved.

The invention consists in the novel steps, parts, constructions, arrangements, processes, combinations and improvements herein shown and described.

The drawing schematically illustrates an exemplary embodiment of the invention.

From a feeding means 1, equipped with a metering means not shown, the liquid to be tested is fed in a uniform flow to a strip 2 of absorbent material, for example filter paper, in uniform motion past a heating means 3. The strip 2 continues past a radiation detector 4 actuating an indicating means 6 by way of an amplifier 5.

Under the action of the heat supplied by the heating means 3, the liquid present in the strip 2 evaporates, therein leaving behind the substances contained in it. In this way residues of a considerable quantity of liquid may concentrated in a given area of strip, the relative concentration being adjustable by choice of flow rate of liquid and rate of advance of the strip with due regard being given to an appropriate heat supply. The indicating means 6 will then indicate a correspondingly elevated radioactivity.

The strip 2 used is preferably a strip of filter paper; alternatively, however, a strip of fabric or one of other absorbent or porous material may be employed.

The feeding means 1, in the example shown, consists of a discharge tube 8 attached to a vessel 7.

The metering means of the feeding means 1 has the function of providing a uniform flow of liquid. In its simplest form, if the liquid level in the vessel is kept constant, it may consist of a constriction in the discharge tube 8.

To distribute the liquid over a larger area of strip 2 and thus obtain more rapid evaporation, the feeding means 1 may execute an oscillatory motion in lengthwise direction of strip 2, transverse thereto, or a combination of both.

The device illustrated has the advantage that no air pump, air filter or atomizing means is required for the liquid, etc. It is therefore simple in construction, requires little attention, and affords greater dependability. At the same time, the results of measurement are more accurate than in known devices, because the influence of the radioactivity of the air and the effectiveness of deposition of particles contained in the stream of air upon the filtering strip, and/or of residual activity on the collector strip, is eliminated.

The invention in its broader aspects is not limited to the specific mechanisms shown and described but departures may be made therefrom, within the scope of the accompanying claims, without departing from the principles of the invention and without sacrificing its chief advantages.

What I claim is:

1. A method of continuously measuring the radioactivity of substances contained in a liquid, comprising the steps of depositing said liquid directly from a source at a uniform rate in liquid, unaerated form on a previously uncontaminated absorbent surface, said surface being adapted to absorb said liquid as the same is supplied thereto and the region of said surface being substantially free of turbulent air currents to insure accurate deposition of said liquid, conjointly driving said surface at a substantially continuous and uniform rate to transport said absorbed liquid away from said source, continuously evaporating at least a portion of said absorbed liquid as the same moves away from said source, maintaining the said driving of said surface to transport the residue on said absorbent surface away from the point where said evaporation occurs and towards a measuring site, and continuously measuring at said site the radioactivity of said residue as the same is transported therethrough.

2. Apparatus for continuously measuring the radioactivity of substances contained in a liquid comprising a strip of previously uncontaminated material adapted to absorb said liquid, metered feeding means for feeding said liquid in liquid, unaerated form directly to said strip, said strip being located in a region substantially free of turbulent air currents, means coupled to said strip for driving said strip at a continuous uniform rate past said feeding means whereby said liquid fed to said strip is continuously absorbed along the line of action of said strip, heating means, said heating means being disposed in proximity with said moving strip for continuously heating said liquid absorbed in said strip to provide at least partial evaporation thereof, and at least one radiation detector disposed in proximity with said moving strip at a point where said absorbed liquid has been at least partially evaporated therefrom for providing said continuous measurement of radioactivity.

3. Apparatus according to claim 2, characterized in that the feeding means is adapted to oscillate in relation to the strip for increasing the absorbent area of said strip.

4. Apparatus according to claim 2, characterized in that the strip comprises a strip of filter paper.

References Cited in the file of this patent

UNITED STATES PATENTS

| | | |
|---|---|---|
| 2,227,438 | Campbell | Jan. 7, 1941 |
| 2,576,616 | Livingston et al. | Nov. 27, 1951 |
| 2,768,134 | Fermi et al. | Oct. 23, 1956 |
| 2,826,076 | Boretz et al. | Mar. 11, 1958 |
| 2,901,626 | Becker | Aug. 25, 1959 |
| 2,933,608 | Barnothy | Apr. 19, 1960 |
| 2,953,687 | Bergstedt | Sept. 20, 1960 |
| 2,972,678 | Anton | Feb. 21, 1961 |
| 2,985,758 | Bosch | May 23, 1961 |
| 3,017,510 | Roucayrol et al. | Jan. 16, 1962 |

OTHER REFERENCES

Wingo: Apparatus for Automatically Scanning Two-Dimensional Paper Chromatograms, Analytical Chemistry, September 1954, pp. 1527–28.

Wingfield et al.: A Monitor for Low-Level Radioactivity in Liquid Streams, printed for the AEC, January 1956, DP–145.

Collins: Continuous Monitor for Airborne Plutonium, printed for the AEC, November 1956 and issued by E. I. du Pont, Savannah River Laboratory.